US007039423B2

(12) United States Patent
Daniel et al.

(10) Patent No.: US 7,039,423 B2
(45) Date of Patent: May 2, 2006

(54) METHOD FOR OPERATING A CELLULAR TELECOMMUNICATIONS NETWORK, AND METHOD FOR OPERATING A PERSONAL CELLULAR TELECOMMUNICATIONS DEVICE

(75) Inventors: Ronen Daniel, Ramat Gan (IL); Uri Baron, Ra'anana (IL); Yossi Wellingstein, Tel Aviv (IL)

(73) Assignee: Celltick Technologies Ltd., Herzliya (IL)

( * ) Notice: Subject to any disclaimer, the term of this patent is extended or adjusted under 35 U.S.C. 154(b) by 435 days.

(21) Appl. No.: 09/980,114

(22) PCT Filed: Jan. 14, 2001

(86) PCT No.: PCT/IL01/00037

§ 371 (c)(1),
(2), (4) Date: Mar. 4, 2002

(87) PCT Pub. No.: WO01/52558

PCT Pub. Date: Jul. 19, 2001

(65) Prior Publication Data

US 2003/0013439 A1    Jan. 16, 2003

(30) Foreign Application Priority Data

Jan. 13, 2000    (IL)    ...................... 134035

(51) Int. Cl.
*H04Q 7/20*    (2006.01)
(52) U.S. Cl. .............. 455/456.3; 455/414.3; 455/466
(58) Field of Classification Search ............. 455/412.1, 455/412.2, 414.1, 414.2, 414.3, 418, 419, 455/456.1, 456.2, 456.3, 566, 567, 466
See application file for complete search history.

(56) References Cited

U.S. PATENT DOCUMENTS

| 5,553,314 | A | * | 9/1996 | Grube et al. ................ 455/514 |
| 5,555,446 | A | * | 9/1996 | Jasinski ..................... 340/7.21 |
| 5,687,216 | A | * | 11/1997 | Svensson ................. 455/412.2 |
| 5,692,032 | A | * | 11/1997 | Seppanen et al. ........... 455/466 |
| 5,701,580 | A | * | 12/1997 | Yamane et al. ............. 455/3.01 |
| 5,870,030 | A | * | 2/1999 | DeLuca et al. ............ 340/7.48 |
| 5,878,033 | A |   | 3/1999 | Mouly |
| 5,926,104 | A | * | 7/1999 | Robinson ............... 340/825.22 |
| 6,018,522 | A | * | 1/2000 | Schultz ........................ 725/86 |
| 6,060,997 | A | * | 5/2000 | Taubenheim et al. ...... 340/7.52 |
| 6,173,316 | B1 | * | 1/2001 | De Boor et al. ............ 709/218 |
| 6,230,019 | B1 | * | 5/2001 | Lee ............................ 455/466 |
| 6,298,239 | B1 | * | 10/2001 | Yonemoto et al. .......... 455/466 |
| 6,341,228 | B1 | * | 1/2002 | Hubbe et al. ............... 455/566 |
| 6,363,419 | B1 | * | 3/2002 | Martin ....................... 709/219 |

(Continued)

FOREIGN PATENT DOCUMENTS

EP    0 955 779 A1    11/1999

(Continued)

*Primary Examiner*—Quochien B. Vuong
*Assistant Examiner*—Lewis West
(74) *Attorney, Agent, or Firm*—Nath & Associates PLLC; Harold L. Novick

(57) ABSTRACT

For use in a cellular telecommunications network including a plurality of individually addressable Base Transceiver Stations (BTSs) providing bidirectional signal coverage over a predefined geographical area, capable of transmitting Point-To-MultiPoint (PTMP) messages over a Point-To-MultiPoint Service (PTMPS) functionality, and capable of transmitting Point-To-Point (PTP) messages, streaming of a substantially continuous stream of mostly different content, at least some interactive display messages on at least one personal cellular telecommunications device prior to their automatic discarding irrespective of their having been displayed or not.

36 Claims, 5 Drawing Sheets

U.S. PATENT DOCUMENTS

| | | | |
|---|---|---|---|
| 6,385,461 B1 * | 5/2002 | Raith | 455/518 |
| 6,583,714 B1 * | 6/2003 | Gabou et al. | 340/5.54 |
| 6,615,039 B1 * | 9/2003 | Eldering | 455/418 |
| 6,628,936 B1 * | 9/2003 | Furuya | 455/412.1 |
| 2003/0181201 A1 * | 9/2003 | Bomze et al. | 455/414.3 |
| 2004/0078427 A1 * | 4/2004 | Gil et al. | 709/203 |
| 2004/0127199 A1 * | 7/2004 | Kagan et al. | 455/414.1 |
| 2004/0157628 A1 * | 8/2004 | Daniel et al. | 455/466 |

FOREIGN PATENT DOCUMENTS

| | | | |
|---|---|---|---|
| GB | 2320600 A | | 6/1998 |
| GB | 2327567 A | * | 1/1999 |
| WO | WO 98/10604 | | 3/1998 |
| WO | WO 98/10604 A1 | * | 3/1998 |

* cited by examiner

| | NATIONAL | SCHOOLS | HIGHWAYS |
|---|---|---|---|
| 08:00–08:15 | NEWS | NEWS | NEWS |
| 08:15–08:30 | HOROSCOPE | ANTI-DRUG | TRAFFIC UPDATE |
| 08:30–08:45 | FINANCE | TOP 10 | FINANCE |
| 08:45–09:00 | LOCAL | LOCAL | TRAFFIC UPDATE |
| 09:00–09:15 | NEWS | NEWS | NEWS |

METHOD FOR OPERATING A CELLULAR TELECOMMUNICATIONS NETWORK, AND METHOD FOR OPERATING A PERSONAL CELLULAR TELECOMMUNICATIONS DEVICE

FIELD OF THE INVENTION

The invention relates to the operation of cellular telecommunications networks, and personal cellular telecommunications devices.

BACKGROUND OF THE INVENTION

Global Networks for Mobile Communications (GSM) digital cellular telecommunications networks have now been deployed alongside wireline telecommunications networks in over a 100 countries. GSM supports a so-called Short Message Service (SMS) functionality in two flavors: point-to-point for sending a point-to-point message (SMS/PP) from a network operator to a single personal cellular telecommunications device, and point-to-multipoint for sending a Cell Broadcast (SMS/CB) message from a network operator to a plurality of personal cellular telecommunications devices located in one or more cells. For more details regarding the different classes of SMS messages, reference can be made to ETSI TS 100 900 Version 7.2 (GSM 03.38 Version 7.2), the contents of which are incorporated by reference.

In WO98/10604 entitled "Interactive Cell Broadcast Service", there is illustrated and described a method and apparatus for transmitting SMS/CB display messages to subscribers who are prompted to respond by depressing a pushbutton for immediately originating either a telephone call or an SMS/PP message to an embedded callback number. One particular application of the interactive cell broadcast service is for requesting a service which can then be provided by so-called over the air programming. Each SMS/CB message is displayed on the entire display screen either immediately upon its receipt, or when requested by the user (see page 11, lines 27–29 of the specification). Both approaches severely limit the interactive cell broadcast service in terms of the rate at which SMS/CB messages can be transmitted as follows. In the former, immediately displaying SMS/CB messages on a display screen annoyingly interrupts the operation of the device from the point of view of the subscriber who would therefore be inclined to disable the service. And in the latter, storing SMS/CB messages requires considerable memory resources, and requiring a user to retrieve each SMS/CB message individually (and thereafter delete them individually) is time consuming and battery wasteful.

SUMMARY OF THE INVENTION

Broadly speaking, the present invention is directed toward the streaming of mostly different content at least some interactive display messages on personal cellular telecommunications devices for the benefit of subscribers for no more than their occasional glancing at their personal cellular telecommunications devices' display screens which they often do anyway, for example, to check the time. The present invention can display both Point-To-Point (PTP) display messages and Point-To-MultiPoint (PTMP) display messages but in the case that PTP display messages and PTMP display messages are simultaneously transmitted over their respective air interface channels, the former display messages typically have a higher display priority than the latter such that they are preferentially displayed.

The display messages are intended to have mostly different content including inter alia news items, financial information, promotional offers, and the like, in the form of alphanumeric messages, graphic messages, video clips, and the like. Whilst some display messages will by their nature be repeated on a regular basis, for example, display messages advertising a soft drink, the term mostly different is intended to convey that identical display messages are not display during consecutive time intervals of, say, between 1 minute and 5 minutes. At least some of the display messages are intended to be interactive in the sense that a subscriber can automatically activate a point-to-point transmission response mechanism from a dedicated response means integrally provided in a display message. The existence of a dedicated response means does not necessarily have to be indicated on a display message to a subscriber but can be understood by him as being available a matter of course. A response mechanism can be pushbutton activated, voice activated, or touchpad activated. In the case of pushbutton activated response means, each response means may be a dedicated "MORE INFO" key, or a key selectively dedicated for the response means but otherwise a conventional key, for example, the key "*" as may appear in a display message, for example, "PRESS * FOR MORE INFO". The display messages are preferably transmitted at a maximum rate of a new display message about every 5 seconds on a so-called 24/7 basis i.e. all day every day, thereby, on the one hand, rendering an interesting eye catching service of streaming display messages but, on the other hand, still providing sufficient response time for a subscriber to activate a response mechanism. Obviously, display messages can be transmitted at slower rates, say, down to one display message about every 2 minutes, or even slower, say, one display message about every 5 minutes, and for shorter periods, say, 10 minutes of display messages on the hour during peak broadcasting hours only.

The display messages can occupy different regions of a display screen as follows: First, they can replace a so-called "idle screen" typically occupying the entire space of a display screen for displaying inter alia network related information, for example, the name of an operator, time, signal strength, batter; strength, the presence of one or more voice messages and/or SMS messages stored in a permanent storage buffer prior to their deletion, and the like. And second, they can occupy a portion of a split screen, for example, a horizontally disposed banner portion, also typically having a major portion for normally displaying an idle screen. In the latter instance, the banner portion may be a permanent feature of a display screen or it may be replaced together with the first portion in a similar manner to the first instance on the invoking of a non-idle activity specific screen having at least some indication of an ongoing activist including inter alia the entire process from establishment to tear down of a voice call irrespective of whether a subscriber is the originating party or the receiving party, and any other subscriber initiated activity, for example, retrieving an item stored in memory, playing a game, writing a memo, and the like. An exemplary "idle screen" within the spirit of the present invention is displayed in the so-called User Idle Screen Available Event (see 3GPP TS 31.111 V4.0.0 3rd Generation Partnership Project; Technical Specification Group Terminals; USIM Application Toolkit (USAT) (Release 4)).

The envisaged streaming of display messages provides a most convenient platform for m-commerce applications, and in particular interactive m-commerce applications catering for a wide range of ages, lifestyles, and the like. It is believed that its exposure to the general public will be far greater than that of conventional radio, television and cable broadcasting services taking into consideration the ubiquity of personal cellular telecommunications devices, the fact that most subscribers now take their personal cellular telecommunications devices wherever they go, and the fact that they are in idle mode for most of the time that they are powered on. Moreover, unlike conventional broadcasting services which are at best regional services, since each BTS can be individually addressed, the present invention readily facilitates the transmitting of far more location specific content down to the granularity of a single BTS than hitherto achievable. In this connection, additional BTSs can also be readily deployed for the sole purpose of transmitting specific content at particular locations.

BRIEF DESCRIPTION OF THE DRAWINGS

In order to understand the invention and to see how it can be carried out in practice, a preferred embodiment will now be described, by way of a non-limiting example only, with reference to the accompanying drawings, in which similar parts are likewise numbered, and in which.

DETAILED DESCRIPTION OF THE DRAWINGS

Figure 1:
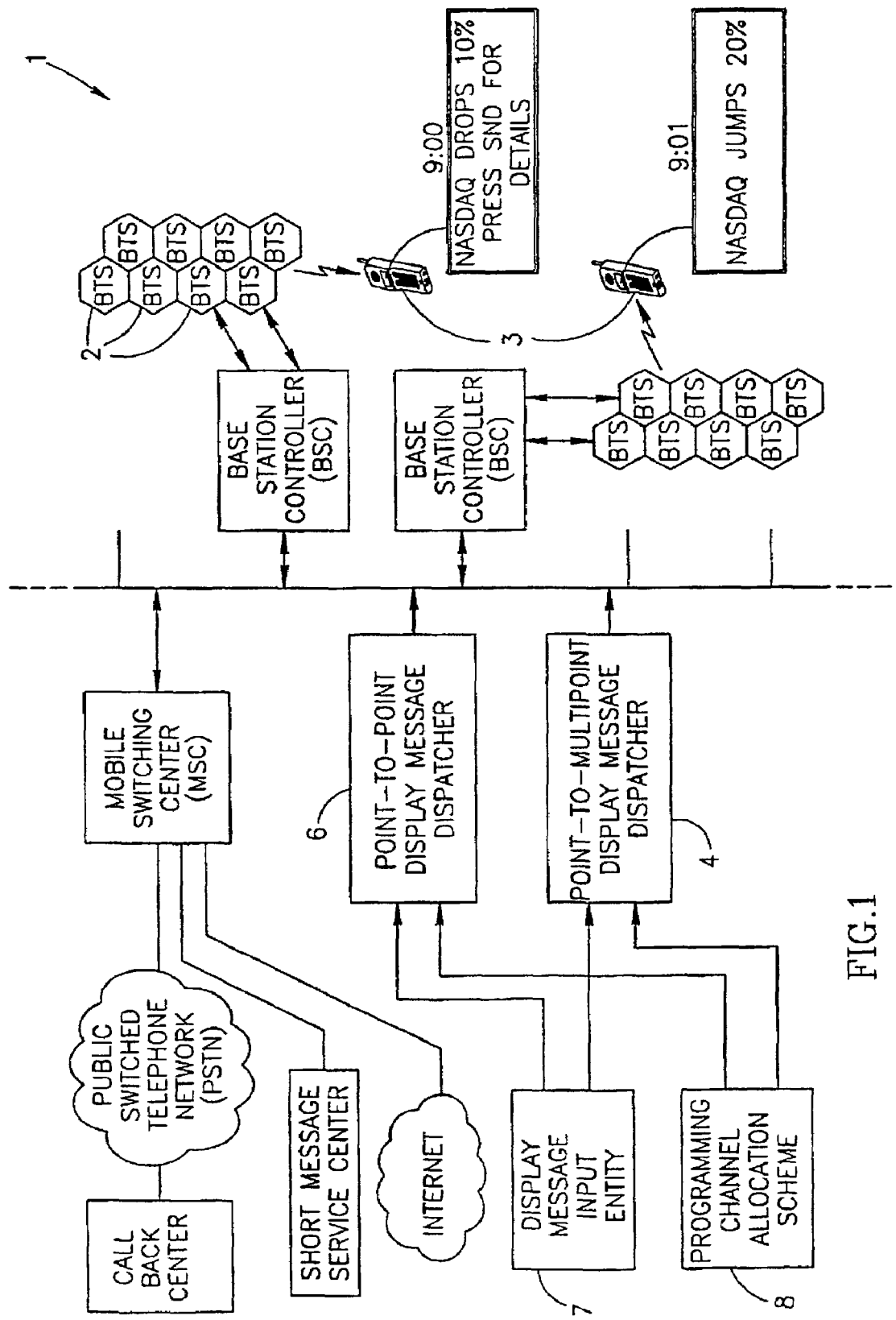
FIG. 1 is a schematic representation of a cellular telecommunications network for transmitting a multi-programming channel 24/7 cellular broadcasting service for the streaming of display messages on personal cellular telecommunications device in a screen saver-like manner.

FIG. 1 shows a cellular telecommunications network 1 capable of transmitting a multi-programming channel 24/7 cellular broadcasting service to a plurality of individually addressable BTSs 2 each providing bidirectional signal coverage over a predefined geographical area ranging from so-called typically indoor pico cells each covering a few square meters through so-called micro cells each covering anywhere from a few tens to a few hundreds of square meters upto cells covering several square kilometers. The BTSs 2 are each capable of transmitting Point-To-Multi-Point (PTMP) display messages and Point-To-Point (PTP) display messages for streaming mostly different content, mostly interactive display messages on personal cellular telecommunications devices 3. The PTMP display messages are dispatched from a Point-To-MultiPoint Display Message Dispatcher 4 and the PTP display messages are dispatched from a Point-To-Point Display Message Dispatcher 6. Both the PTMP display messages and the PTP display messages originate at a Display Message Input Entity 7. The devices 3 include inter alia simple handset phones, smartphones, combined PDA/phones, combined MIP3 music players/phones, and the like.

Figures 2, 3:
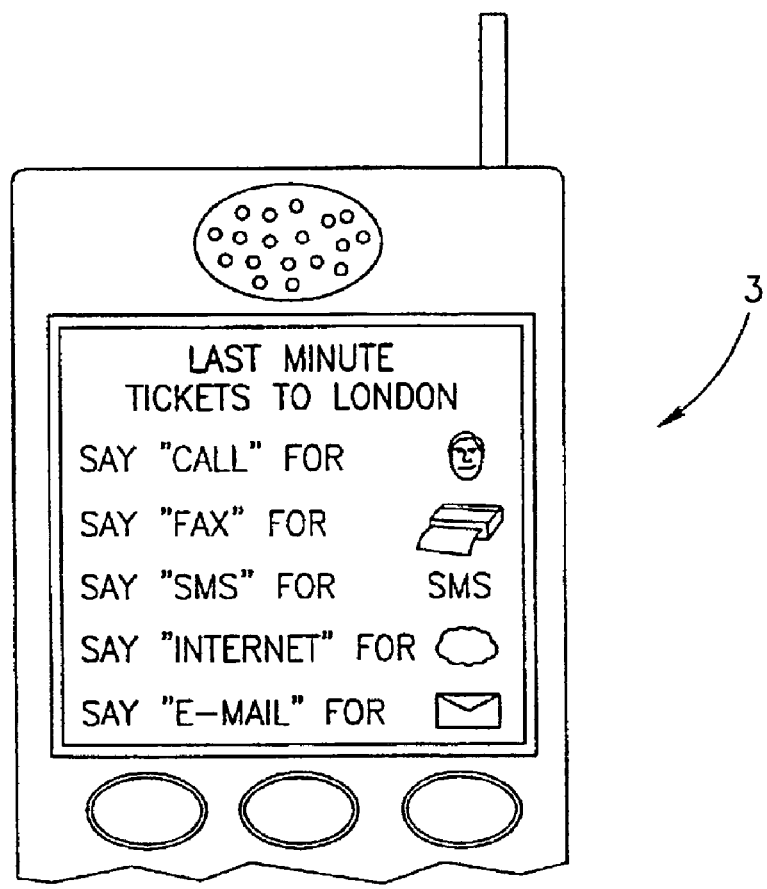
FIG. 2 is a schematic representation of a voice activated display message for enabling subscriber activation of one of at least two point-to-point transmission response mechanisms.
FIG. 3 is a schematic representation showing the programs to be broadcast during the first hour of each of three programming channels of the cellular broadcasting service.

FIG. 1 also shows two exemplary successive time-sensitive display messages displayed in a screen saver-like manner replacing a normally displayed idle screen. The display messages include "NASDAQ DROPS 10% PRESS SND FOR DETAILS" display at 9:00 and "NASDAQ JUMPS 20%" displayed at 9:01. The 9:00 display message is an example of a display message prompting a subscriber as to the action required by him to obtain additional information from an information provider. Against this, the 9:01 display message is an example of a display message which does not prompt a subscriber as to which action is needs to take to obtain additional information since he is already cognizant of the fact that pressing the SND key will automatically connect him to a suitable information service. FIG. 2 shows a display message prompting a subscriber to activate a point-to-point transmission response mechanism from the list of: a voice call; an SMS; a data session, for example, an Internet browsing session, a SIM browsing session, and the like; e-mail; and a facsimile transmission.

FIG. 3 shows that a cellular broadcasting service can include a non-geocoded or nationwide programming channel, and one or more geocoded programming channels for transmitting streams of PTMP and PTP display messages from logical groups of BTSs each including one or more BTSs. Each logical group of BTSs either covers an extended contiguous geographical area, for example, a metropolitan area or geographical areas sharing a common theme, for example, schools, along highways, and the like. The programming channels typically include time slots for transmitting programs which are either common to both the nationwide programming channel and the geocoded programming channels, for example, the News, or dedicated to a particular logical group of BTSs, for example, an Anti-drug program for transmission at BTSs of the logical group of BTSs which cover schools, Traffic updates for transmission at BTSs of the logical group of BTSs which cover major highways, and the like. Also, a geocoded programming channel can be itself segmented to two or more so-called geocoded programming sub-channels each to be transmitted at a subset of the BTSs of the logical group of BTSs associated with the geocoded programming channel. For example, the school programming channel can be segmented to an elementary school programming sub-channel, a high school programming sub-channel, and a college programming sub-channel.

It should be noted that a BTS may be assigned to one or more geocoded programming channels depending on its location, for example, a BTS which covers a geographical area containing both a football stadium and a shopping mall in most likelihood will be assigned to both a sports programming channel and a shopping programming channel of the cellular broadcasting service to maximize its efficacy in terms of geocoded content. In such instance, a programming channel allocation scheme 8 can be provided for determining which stream of PTMP or PTP display messages should be displayed at each BTS. The schemes can be time dependent, for example, sports programming channel be transmitted during a time interval starting 2 hours before the start of a football match and ending 2 hours after the football match ends, the shopping programming channel be transmitted at other times when available for transmission, and the nationwide programming channel be transmitted at all other times that neither the sports programming channel nor the shopping programming channel are available for transmission.

Figure 4:
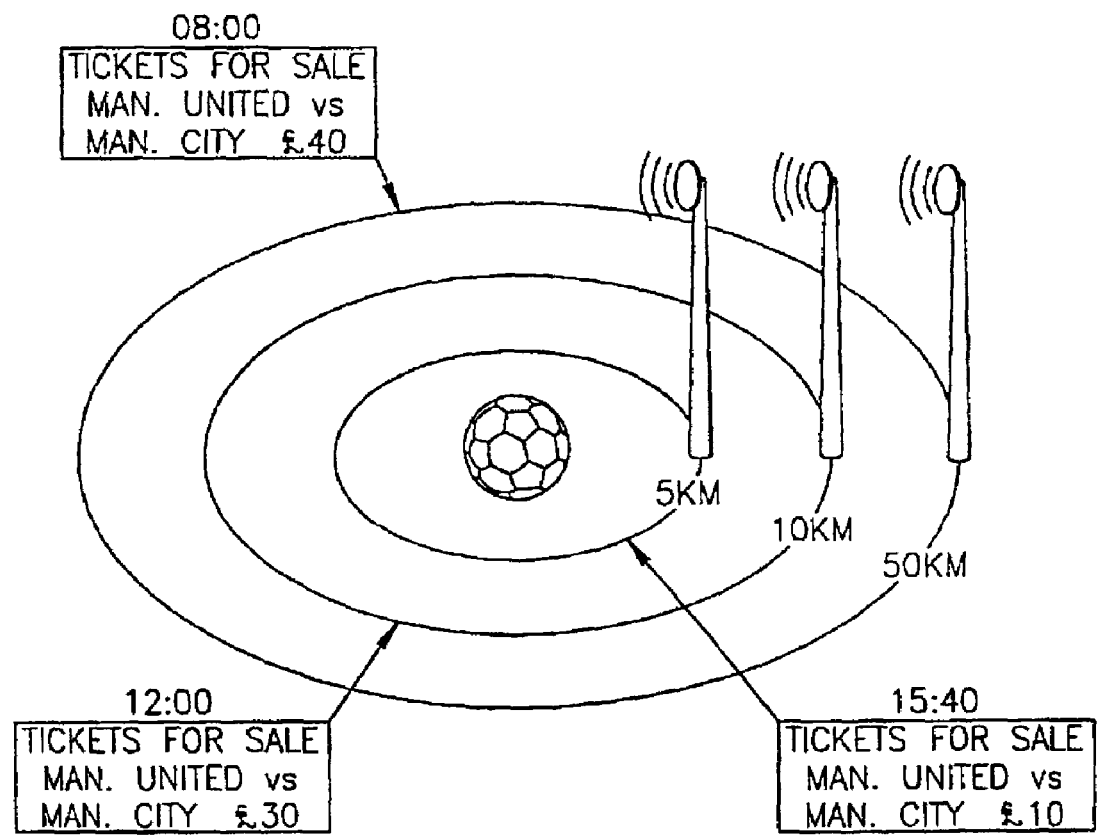
FIG. 4 is a schematic representation showing a staggered sequence of display messages for advertising tickets for a football game over progressively smaller geographical areas at progressively lower purchase prices.

FIG. 4 shows a staggered sequence of display messages for advertising tickets for a football game to take place at a stadium over progressively smaller geographical areas and at progressively lower prices on the same day as the game assuming that unsold tickets still available. Such display messages may be either PTMP display messages, or PTP display messages transmitted to subscribers listed in the fan club of the stadium's home team. The geographical areas are usually centered around the stadium, and are such that a subscriber can still reach the stadium in time for kick-off. Such an advertising campaign can be readily applied to other items with either a fixed "sellby" date or a limited stock, for example, for advertising a clearance sale of consumer items at a retail outlet.

Figure 5:
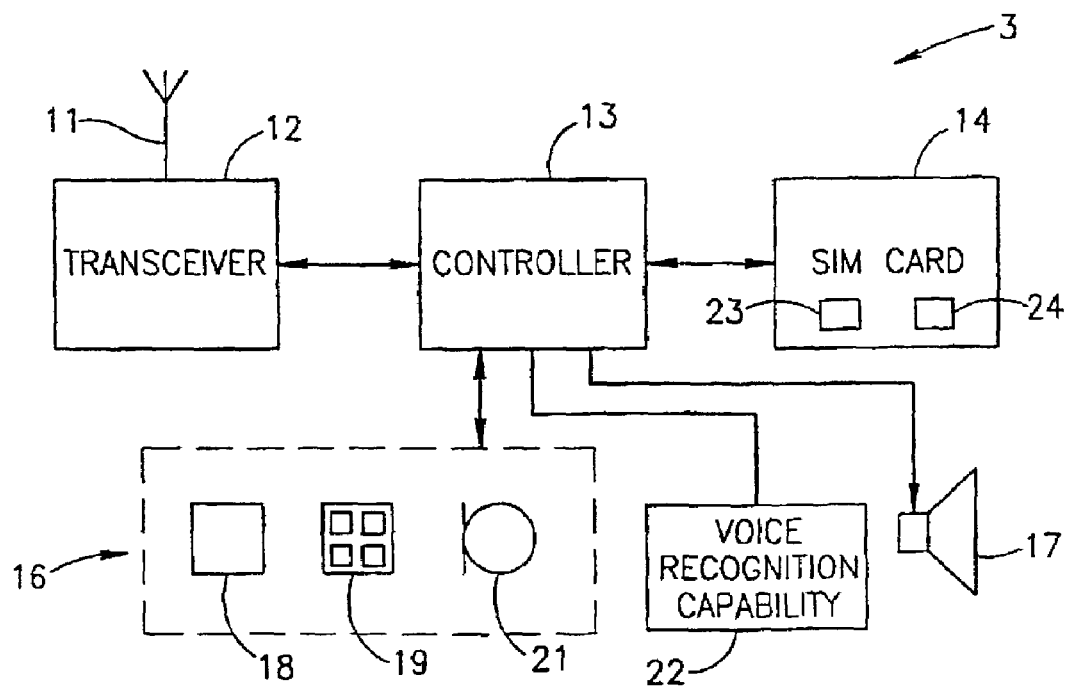
FIG. 5 is a schematic representation of a personal cellular telecommunications device for supporting the streaming of display messages thereon in a screen saver-like manner.

FIG. 5 shows a GSM based personal cellular telecommunications device 3 including an antenna 11, a transceiver 12, a controller 13 providing a clock time denoted $T_{CLOCK}$, a SIM card 14 (constituting a smart card), a subscriber interface 16, and a loudspeaker 17. The subscriber interface 16 includes a display screen 18, a keypad 19, and a microphone 21. The display screen 18 may be a touchpad. The device 3 may also include a voice recognition capability 22 for supporting voice activated activities including inter alia dialing, invoking a response mechanism, and the like. The SIM card 14 includes two fixed size dynamic storage buffers 23 and 24 for temporarily storing PTMP display messages and PTP display messages, respectively, passed thereto by the controller 13 prior to their being automatically discarded in accordance with a display message discard scheme irrespective of their having been displayed or not. The entire handling of a display message from its receipt through to its being automatically discarded is a completely silent process irrespective of whether the display message is displayed or not.

Figure 6:
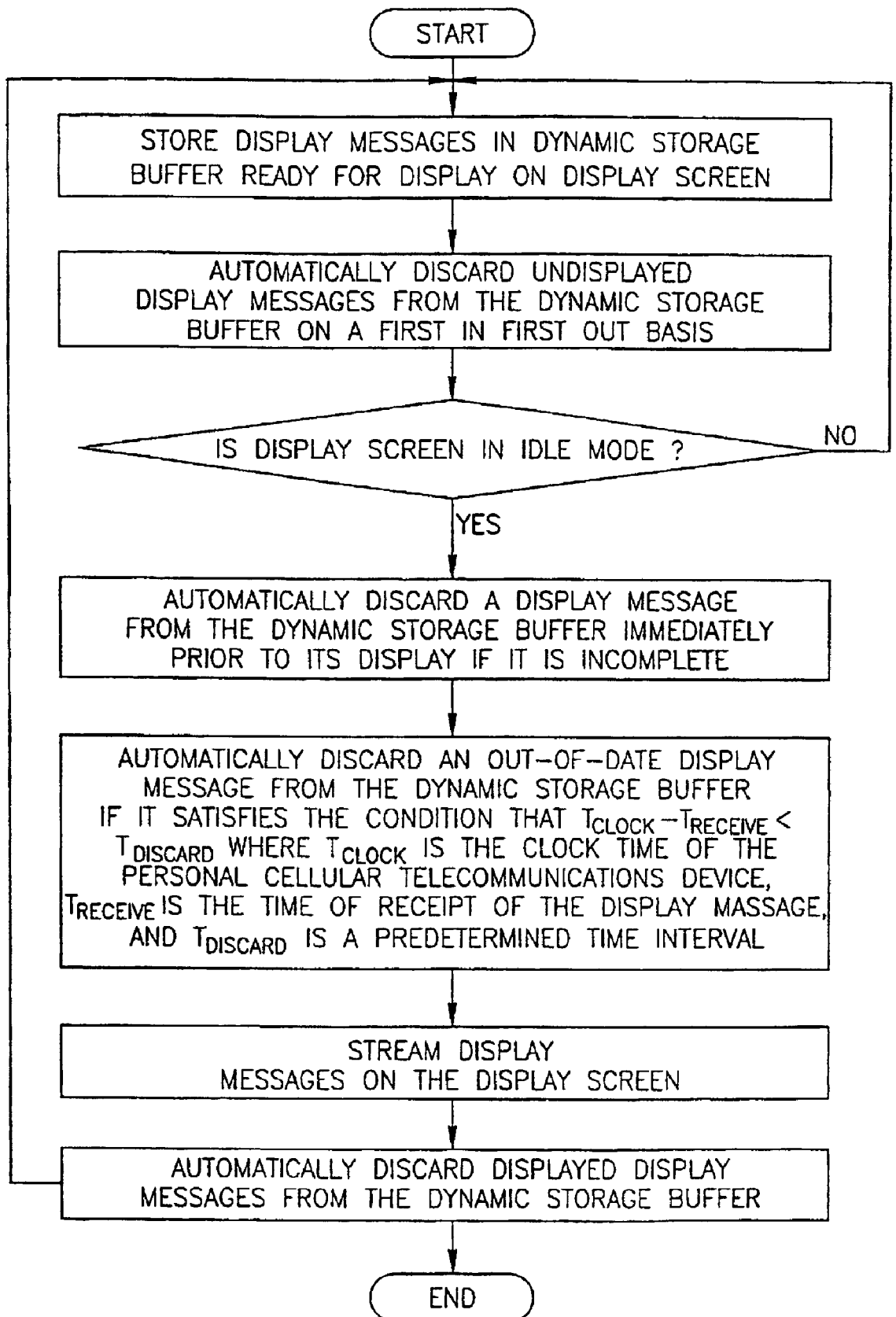
FIG. 6 is a flow diagram for streaming display messages on a personal cellular telecommunications device in a screen saver-like manner.

The operation of the screen saver-like application in respect of each of the dynamic storage buffers 23 and 24, as shown in FIG. 6, is as follows: The display message discard scheme automatically discards undisplayed display messages from a dynanic storage buffer on a First In First Out basis, thereby ensuring that the dynamic storage buffer only stores the most recently received display messages, and automatically discards display messages after they are displayed. In addition, assuming that the display screen is available for display of a display message, immediately before a display message is actually displayed, the following checks are made: First, since display messages may be incomplete due to any one of several occurrences, for example, air interface interference, hand over between cells, and the like, each display message is checked for completeness and if it is found to be incomplete, it is automatically discarded. Second, since at least some of the display messages are time sensitive, each display message is checked for its not being out-of-date by its satisfying the following condition:

$$T_{CLOCK} - T_{RECEIVE}[[T_{RECEIPT}]] < T_{DISCARD};$$

where $T_{CLOCK}$ is the clock time, $T_{RECEIVE}$ is its time of receipt, and $T_{DISCARD}$ is a predetermined time interval, for example, three minutes, which is necessary.

Figure 7A:
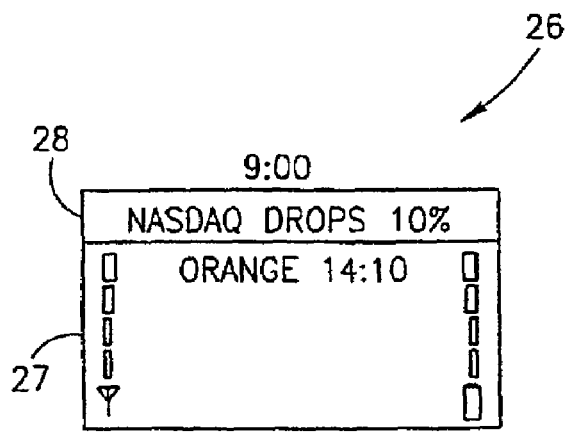
FIGS. 7A–7D are schematic representations of different modes of operation of a personal cellular telecommunications device having a split screen display screen.
Figure 7B:
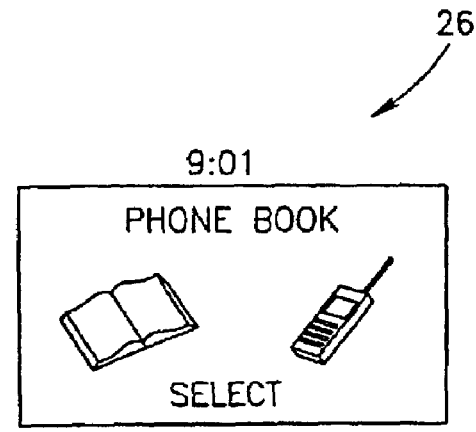
Figure 7C:
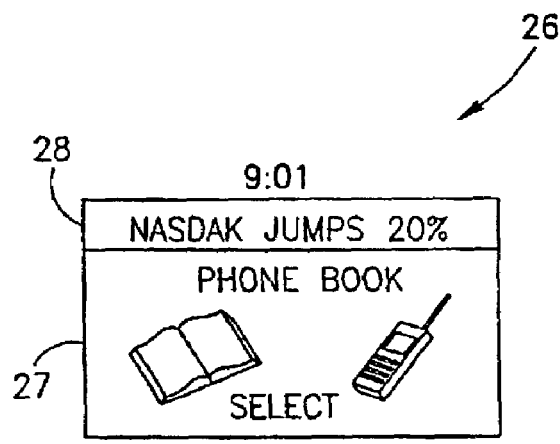
Figure 7D:
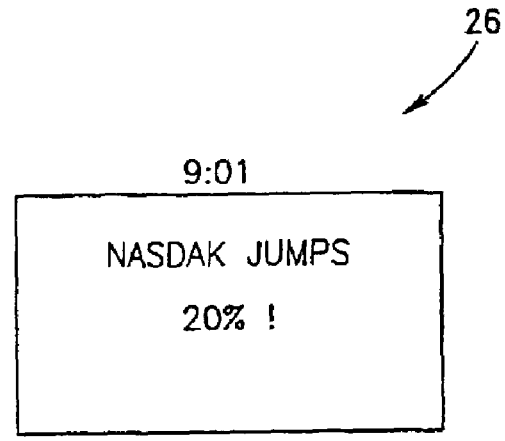

FIGS. 7A–7D show different modes of streaming of display messages on a personal cellular telecommunications device having a split screen display screen 26 including a major portion 27, and a minor horizontal banner portion 28. FIG. 7A shows that the major portion 27 displays an idle screen whilst the banner portion 28 shows a stream of at least some interactive display messages whilst FIG. 7B shows that the display messages are only displayed on the banner portion 28 when the idle screen is displayed on the major portion 27. FIG. 7C shows that the banner portion 28 is a permanent feature of the split screen display screen 26 either occupying only a portion thereof, or that it can be extended to include the entire display screen 26 instead of the major portion 27 displaying an idle screen (see FIG. 7D).

While the invention has been described with respect to a limited number of embodiments, it will be appreciated that many variations, modifications, and other applications of the invention can be made within the scope of the appended claims. For example, whilst the present invention has been described in parts with reference to its GSM implementation, it is suitable for implementation by both existing or still evolving technologies including inter alia PCS, GPRS, 3G, CDMA, UMTS, W-CDMA, and the like, and/or both existing and still evolving services including inter alia PTM-M, PTM-G, IP-M, MDS, and the like.

The invention claimed is:

1. For use in a cellular telecommunications network including a plurality of individually addressable Base Transceiver Stations (BTSs) providing bidirectional signal coverage over a predefined geographical area, capable of transmitting Point-To-MultiPoint (PTMP) messages over a Point-To-MultiPoint Service (PTMPS) functionality and capable of transmitting Point-To-Point (PTP) messages, a method for operating the cellular telecommunications network comprising the step of transmitting a cellular broadcasting service consisting of a substantially continuous stream of mostly different content, at least some interactive display messages for streaming display on at least one enabled personal cellular telecommunications devices where each interactive display message enables a subscriber to automatically activate a point-to-point transmission response mechanism integrally provided in a display message and can be actuated by a dedicated response means associated therewith, said transmitting step including transmitting a staggered sequence of display messages advertising an item in progressively smaller geographical areas centered around a predefined location.

2. The method according to claim 1 wherein the staggered sequence of display messages advertises progressively lower purchase prices for the item in accordance with a pricing scheme.

3. For use in a cellular telecommunications network including a plurality of Base Transceiver Stations (BTSs) including a plurality of individually addressable Base Transceiver Stations (BTSs) each providing bidirectional signal coverage over a predefined geographical area, a method for operating a personal cellular telecommunications device including a subscriber interface having a display screen, a method for advertising the purchase price of an item, the method comprising the step of displaying a staggered sequence of display messages on the display screen advertising the item in progressively smaller geographical areas centered around a predefined location.

4. The method according to claim 3 wherein the staggered sequence of display messages advertise progressively lower purchase prices for the item.

5. The method according to claim 3 wherein the display messages are PTMP display messages.

6. The method according to claim 3 wherein the display messages are PTP display messages.

7. A cellular telecommunications method including
   a. Silently receiving a plurality of individual, interactive display messages by a personal cellular telecommunications device without any action by a user or said device, said device having a display screen that normally displays an idle screen, and each interactive display message having mostly different content from the other plurality of interactive display messages and enabling a user of said device to activate a point to point transmission response mechanism;
   b. Temporarily storing each of said silently received interactive display messages in a dynamic storage buffer contained in said telecommunications device;
   c. If an idle screen is being displayed, streaming individual ones of said stored display messages from said dynamic storage buffer for display on at least a portion of said display screen;
   d. Interrupting said displaying of said streaming display messages to display a non-idle activity specific screen; and
   e. Automatically, silently discarding display messages from said dynamic storage buffer in accordance with a display message discard scheme irrespective of a display message having been displayed on the display screen or not.

8. The cellular telecommunications method as claimed in claim 7 wherein said display messages are sent by a cellular broadcasting service as a stream of individual PTMP display messages for streaming on a cellular telecommunications device.

9. The cellular telecommunications network according to claim 8 wherein the cellular telecommunications network is a GSM network and the display messages are sent as an SMS Class 2 type.

10. The cellular telecommunications method as claimed in claim 7 wherein said streaming step is done automatically in a screen saver-like manner.

11. The cellular telecommunications method as claimed in claim 7, and further including the step of:
   (f) a user activating an interactive display message while the display message is being displayed to initiate a PTP transmission.

12. The cellular telecommunications method as claimed in claim 7,
   wherein said display screen of said telecommunications device includes a split screen display screen including a first portion and a second portion;
   wherein said stored display messages are for display on said second portion of said display screen; and
   wherein said idle screen, when displayed, is displayed on said first portion of the display screen; and said display messages, when displayed, are automatically streamed from the dynamic storage buffer on the second portion of the display screen.

13. The cellular telecommunications method as claimed in claim 7, and further including checking a display message as being complete before being displayed.

14. The cellular telecommunications method as claimed in claim 13, and further including automatically discarding an incomplete message immediately prior to its display.

15. The cellular telecommunications method as claimed in claim 7, and further including automatically discarding undisplayed display messages from the dynamic storage buffer on a First In First Out (FIFO) basis.

16. The cellular telecommunications method as claimed in claim 7, and further including automatically discarding an out-of-date message immediately prior to its display.

17. The cellular telecommunications method as claimed in claim 16 wherein the method further includes determining that a message is an out-of-date message prior to the display of that message by determining if $T_{CLOCK} - T_{RECEIVE} > T_{DISCARD}$; where $T_{CLOCK}$ is the clock time of the personal cellular telecommunications device when said determining step is performed, $T_{RECEIVE}$ is the time of receipt of the display message at the personal cellular telecommunications device, and $T_{DISCARD}$ is a predetermined time interval.

18. The cellular telecommunications method as claimed in claim 7, wherein said step of automatically discarding display messages includes:
   automatically discarding an incomplete message immediately prior to its display; and
   automatically discarding an out-of-dale message comprising determining that a message is an out-of-date message prior to the display of that message by determining if $T_{CLOCK} - T_{RECEIVE} > T_{DISCARD}$; where $T_{CLOCK}$ is the clock time of the personal cellular telecommunications device, $T_{RECEIVE}$ is the time of receipt of the display message at the personal cellular telecommunications device, and $T_{DISCARD}$ is a predetermined time interval.

19. The cellular telecommunications method as claimed in claim 7 and further including the steps of managing the display messages in accordance with the display message discard scheme including:
   1. checking a display message as being complete before being displayed;
   2. automatically discarding undisplayed display messages from the dynamic storage buffer on a First In First Out (FIFO) basis; and
   3. automatically discarding an out-of-date message immediately prior to its display.

20. The cellular telecommunications method as claimed in claim 7 wherein said receiving step comprises receiving broadcasted stream of individual, interactive display messages which have been transmitted in a Point-To-MultiPoint transmission service functionality by an individually addressable Base Transceiver Station having bidirectional signal coverage over a predefined geographical area that is part of a cellular telecommunications network.

21. The cellular telecommunications method according to claim 20 wherein some display messages are also sent by a cellular broadcasting service as a stream of individual PTP display messages for streaming on a cellular telecommunications device.

22. The method according to claim 21 wherein a PTP display message ready for display is displayed on said display screen in preference to a PTMP display message ready for display.

23. The cellular telecommunications method as claimed in claim 7 wherein said display messages are sent by a cellular broadcasting service as a stream of individual PTP display messages for streaming on a cellular telecommunications device.

24. The cellular telecommunications network according to claim 22 wherein the cellular telecommunications network is a GSM network and the display messages are sent as SMS Class 2 type.

25. The cellular telecommunications method as claimed in claim 7 wherein said personal cellular teleconimunications device further includes a computer program and said method further comprises operating said personal cellular telecommunications device in accordance with said computer program to perfonn said steps of silently receiving, temporarily storing, checking if an idle screen is being displayed and if so streaming display messages, interrupting the displaying of said streaming display messages, and automatically discarding display messages.

26. A program storage device readable by a personable cellular telecommunications device tangibly embodying a program of instructions executable by the personal cellular telecommunications device fur carrying out said cellular telecommunications method as claimed in claim 7 of silently receiving, temporarily storing, checking if an idle screen is being displayed and if so streaming display messages, interrupting the displaying or said streaming display messages, and automatically discarding display messages.

27. A smart card operable with a personal cellular telecommunications device so that the personal cellular telecommunications device carries out said cellular telecommunications method as claimed in claim 7 of silently receiving, temporarily storing, checking if an idle screen is being displayed and if so streaming display messages, interrupting the displaying of said streaming display messages, and automatically discarding display messages.

28. The cellular telecommunications method of operating a cellular telecommunications network as claimed in claim 7, and further including:
  providing a plurality of interactive display messages that are to be received by a personal cellular telecommunications device having a display screen and that are to be handled automatically by said telecommunications device from the receipt of the display message to the discarding of the display message in a completely silent process without any action by a user of said telecommunications device, said provided display messages having mostly different content and being for a streaming display only on at least a part of an idle screen of said display screen of said telecommunications device, said display messages further being of a type that can be automatically stored in and discarded from a dynamic storage buffer contained in the telecommunications device and that also permits the enabling of a user of said telecommunications device to activate a point to point transmission response mechanism that is integrally provided in said display message;
  broadcasting over a particular programming channel a stream of said provided interactive display messages by one or more of a plurality of individually addressable Base Transceiver Stations (BTS) that are part of said cellular telecommunications network, each said BTS providing bidirectional signal coverage over a predefined geographical area and capable of transmitting Point-To-MultiPoint (PTMP) messages over a PTMP Service functionality and capable of transmitting and receiving Point-To-Point (PTP) messages, said display messages being broadcast without consideration of their being received, being displayed, being retained or being discarded on a telecommunications device that has received said display messages; and
  receiving a message from a telecommunications device as a result of a user of said telecommunications device activating a transmission response mechanism that has been enable by one of the broadcasted interactive display messages.

29. The cellular telecommunications method as claimed in claim 28 wherein said provided display messages are PTMP display messages.

30. The cellular telecommunications method of operating a cellular telecommunications network as claimed in claim 28 wherein said broadcasted display messages are broadcasted as a substantially continuous stream.

31. The cellular telecommunications method as claimed in claim 28 wherein a display message enables a subscriber to automatically activate one of at least two different point-to-point transmission response mechanisms from the list of: a voice call; an SMS; a data session; an internet session, an e-mail; and a facsimile transmission, where each response mechanism is integrally provided in a display message and can be actuated by a dedicated response means associated therewith.

32. The cellular telecommunications method as claimed in claim 31 wherein the at least two different response mechanisms are displayed in a menu on a personal cellular telecommunications device in response to subscriber activation of a dedicated response means integrally provided in a display message.

33. The cellular telecomnnmications according to claim 7 wherein a dedicated response means for actuating a response mechanism integrally formed with a display message is selectively actuated by the user.

34. The cellular telecommunications method as claimed in claim 7 wherein a display message enables a subscriber to automatically activate one of at least two different point-to-point transmission response mechanisms from the list of: a voice call; an SMS; a data session; an internet session, an e-mail; and a facsimile transmission, where each response mechanism is integrally provided in a display message and can be actuated by a dedicated response means associated therewith.

35. The cellular telecommunications method as claimed in claim 34 wherein the at least two different response mechanisms are displayed in a menu on a personal cellular telecommunications device in response to subscriber activation of a dedicated response means integrally provided in a display message.

36. The cellular telecommunications method according to claim 35 wherein the at least two response mechanisms are displayed on a personal cellular telecommunications device in response to subscriber activation of a dedicated response means integrally provided in a display message.

* * * * *

UNITED STATES PATENT AND TRADEMARK OFFICE
CERTIFICATE OF CORRECTION

PATENT NO. : 7,039,423 B2
APPLICATION NO. : 09/980114
DATED : May 2, 2006
INVENTOR(S) : Ronen Daniel It is certified that error appears in the above-identified patent and that said Letters Patent is hereby corrected as shown below:

In column 2, line 54, please replace "activist" with --activity--

In column 5, line 10, before "still available" please add --are--

In column 5, line 60, please correct the equation to read: $T_{CLOCK} - T_{RECEIVE} < T_{DISCARD}$ In column 5, line 64, please delete "which is necessary"

In column 8, line 60, please replace "network" with --method--

In column 9, line 10, please replace "fur" with --for--

In column 9, line 14, please replace "or" with --and--

Signed and Sealed this

Sixth Day of July, 2010

David J. Kappos
*Director of the United States Patent and Trademark Office*